(12) United States Patent
Paradis

(10) Patent No.: US 10,843,677 B1
(45) Date of Patent: Nov. 24, 2020

(54) AIR BRAKE HOSE CONNECTION

(71) Applicant: Antonio Paradis, Jacksonville, FL (US)

(72) Inventor: Antonio Paradis, Jacksonville, FL (US)

( * ) Notice: Subject to any disclaimer, the term of this patent is extended or adjusted under 35 U.S.C. 154(b) by 0 days.

(21) Appl. No.: 16/565,697

(22) Filed: Sep. 10, 2019

(51) Int. Cl.
| | |
|---|---|
| *B60T 17/04* | (2006.01) |
| *F16L 33/22* | (2006.01) |
| *F16L 19/00* | (2006.01) |
| *F16L 37/10* | (2006.01) |

(52) U.S. Cl.
CPC .......... *B60T 17/043* (2013.01); *F16L 19/005* (2013.01); *F16L 33/223* (2013.01); *F16L 37/10* (2013.01)

(58) Field of Classification Search
CPC ....... B60T 17/043; F16L 33/223; F16L 37/10; F16L 19/005
USPC ...................................... 285/62, 90
See application file for complete search history.

(56) References Cited

U.S. PATENT DOCUMENTS

| | | | |
|---|---|---|---|
| 4,226,103 A | 10/1980 | Strickland | |
| 5,524,936 A * | 6/1996 | Barr | F16L 19/005 285/90 |
| 5,918,640 A | 7/1999 | Orcutt | |
| 6,123,363 A * | 9/2000 | Burgard | 285/90 |
| 6,386,596 B1 | 5/2002 | Olson | |
| 7,128,345 B2 * | 10/2006 | Bartholoma | 285/90 |
| 2013/0146305 A1 * | 6/2013 | Dupal | F16L 19/005 |
| 2016/0116093 A1 * | 4/2016 | Filipczak | F16L 33/223 |
| 2018/0142814 A1 * | 5/2018 | Eriksen | F16L 19/005 |
| 2019/0170281 A1 * | 6/2019 | Lang | F16L 19/005 |

* cited by examiner

*Primary Examiner* — Zachary T Dragicevich
(74) *Attorney, Agent, or Firm* — Lawrence J. Gibney, Jr.

(57) ABSTRACT

A quick connection device that can connect the air brakes of a semi-truck to the airbrakes of a trailer is disclosed. A coupler plug and coupler body connect together. A securement housing is placed over the coupler connection, to shield the brake connection from road debris and prevent the connection from separating during normal use.

1 Claim, 3 Drawing Sheets

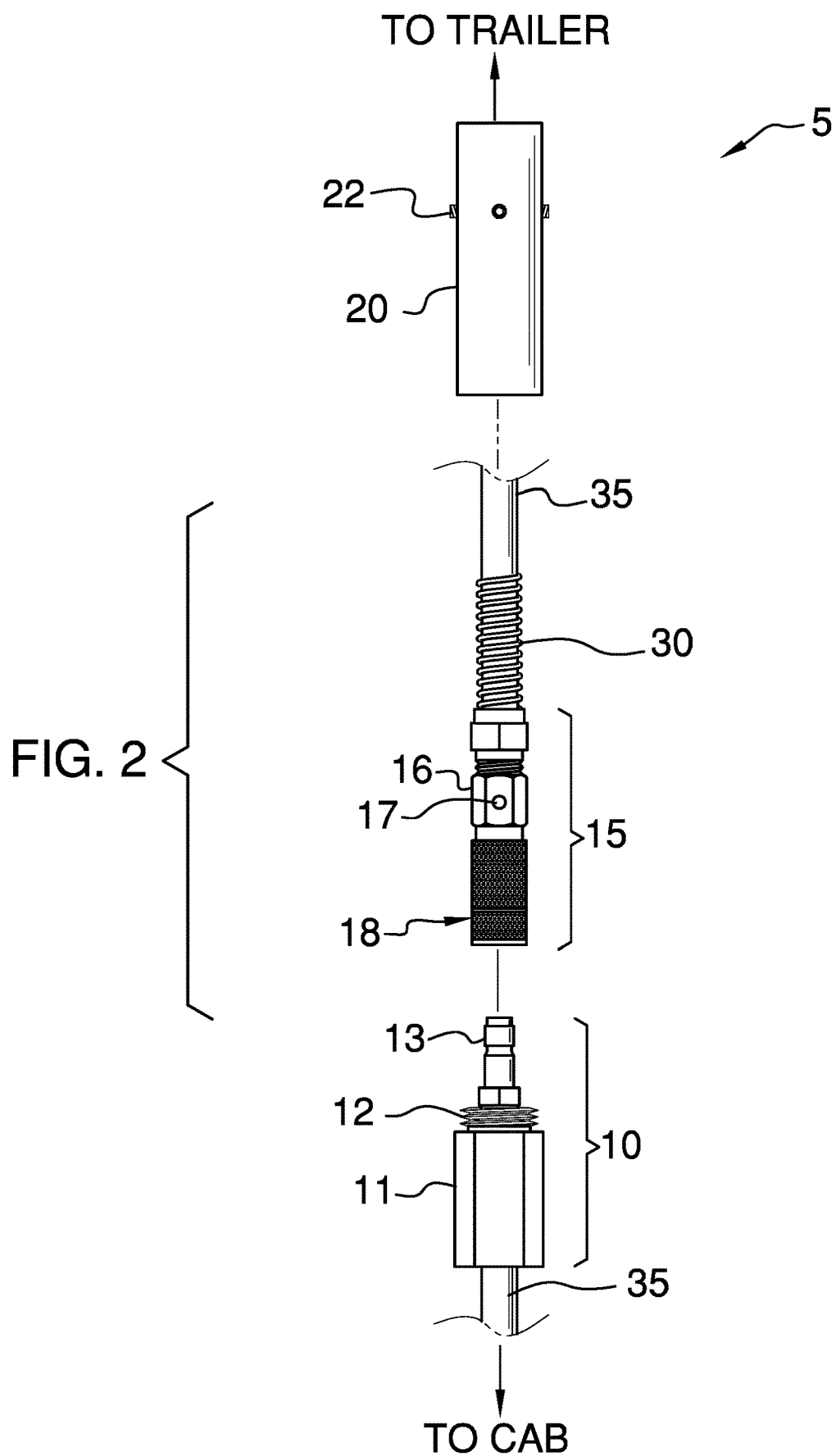

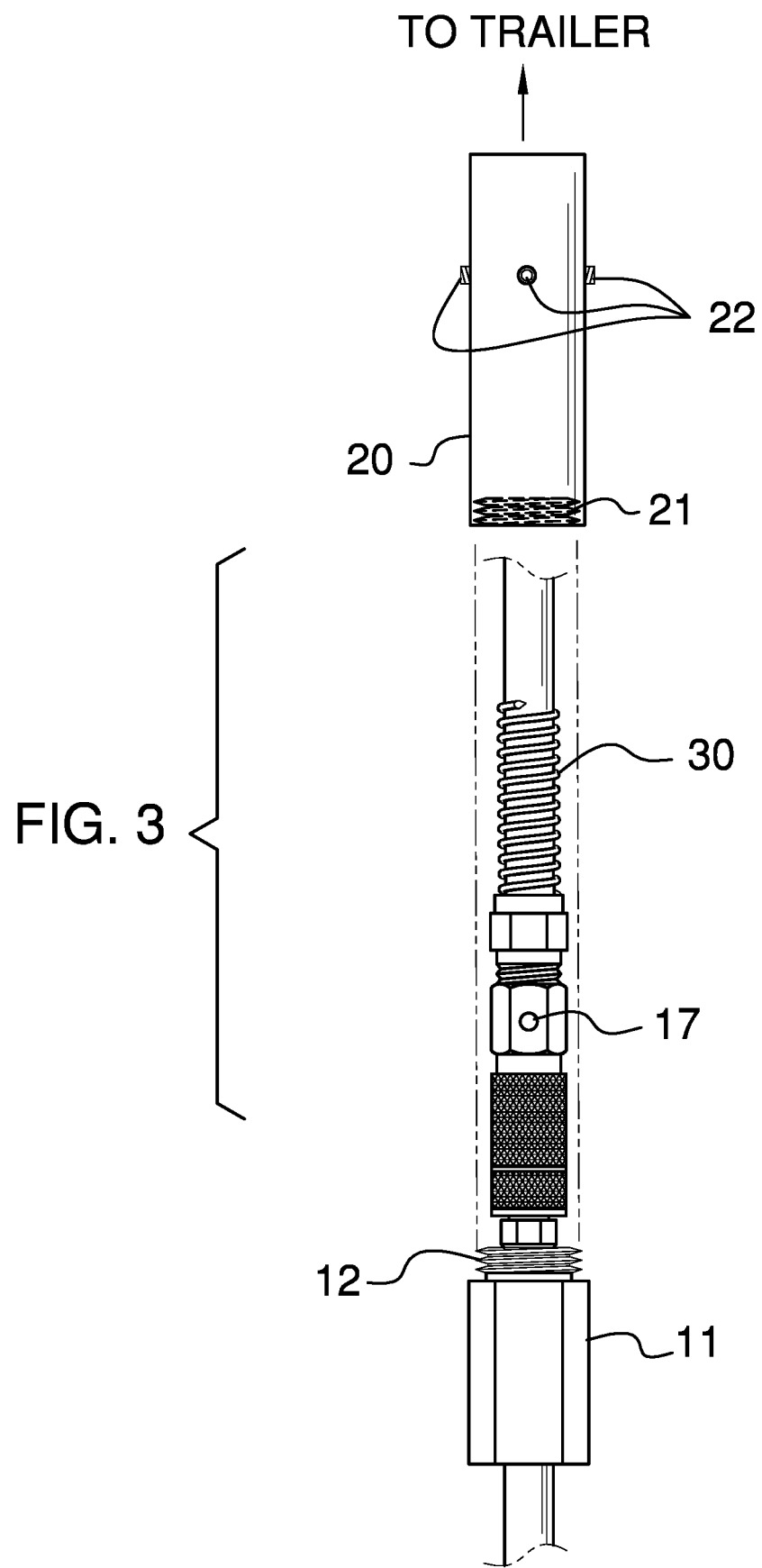

AIR BRAKE HOSE CONNECTION

BACKGROUND OF THE INVENTION

A. Field of the Invention

This invention relates to a connection for an air brake hose between a semi-truck and a tractor trailer.

The typical air brake hose connection between a semi-truck and a semi-trailer utilizes glad hands that interlock by turning them. Within each glad hand fitting of the connection is an O-ring, a tongue, and groove. As the tongue of each glad hand fitting slides into the grove of the other glad hand fitting, the rings of each fitting are compressed against each other. Accordingly, an air-tight seal is created between the fittings.

However, a downfall of the glad hand fittings is that the O-ring will deteriorate and crack from the various environmental stresses incurred from being on a semi-truck. Once the O-rings crack or otherwise deteriorate, the airtight seal is lost, thus the brakes are compromised. The driver is often unaware that the O-ring is ineffective until the brakes are incapable of operating effectively. The glad hand connectors may also be damaged while in use. For example, it is not unusual for rocks to be knocked from the road into the glad hand fittings. This in turn can damage the glad hand or the O-ring within the glad fitting.

Furthermore, because of the durability issues of the glad hand fittings, it is not uncommon for truckers to take the glad hands from another truck or trailer at various truck stops.

The presently disclosed invention increases durability with a unique and novel design while also maintaining the quick connection capabilities for inspection or replacement. The current device is meant to replace the "glad-hands" system.

B. Prior Art

There are prior art references that discuss the glad-hands system. Two representative examples of this type of system can be found at Strickland, U.S. Pat. No. 4,226,103 and Orcutt U.S. Pat. No. 5,918,640. Both these references describe the glad hand system that has two parts. One of the parts is secured to either the cab or trailer of the truck. The other part is attached to the part that is secured to the cab or trailer by mating a pair of O-rings that are on each part and then twisting the parts together. A lip is provided on each section of the glad-hands that allows the two sections to be joined together and stay together. When the two sections of the glad hands are joined pressurized air will flow from the cab to the braking system of the trailer.

The current device is a complete departure from the glad hands system. This device uses two section that are joined together using threads on the respective sections to permit the flow of air from the cab to the trailer.

BRIEF SUMMARY OF THE INVENTION

The present invention is an air brake hose quick connection, which allows for the air brakes of a semi-truck to be quickly attached to the air brakes of a semi-trailer. The present invention also allows for the quick disconnect of the air brakes between the truck and trailer. This is accomplished with the use of a plug coupler being connected to a coupler body and is known as the coupler connection. The plug coupler provides a plug, male threads and an integrated hex member that is connected to an air brake hose at one end. The coupler body provides an area that accepts and locks in the plug of the plug coupler, a second integrated hex member that has a plurality of depressions. When the plug coupler is connected to the body coupler, an air tight connection is made. In order to protect the air brake connection between the truck and the trailer, a securement housing is additionally provided. The securement housing is a hollow cylinder with two ends. Female threads are provided on the first end and a plurality of threaded through-holes are provided on the second end. A plurality of set screws are provided in the treaded through-holes.

The securement housing is placed over the coupler connection and threads onto the male threads of the plug coupler. The sets screws are tightened against the depressions of the coupler body to prevent the securement housing from coming loose and likely twisting off. The set screws of the securement housing additionally assist in preventing the couple plug from disconnecting from the coupler body.

BRIEF DESCRIPTION OF THE DRAWINGS

FIG. 2 is an exploded view of the invention.
FIG. 3 is a partial exploded view of the invention showing the coupler plug connected to the coupler body.

NUMBERING REFERENCE

Figure 1:
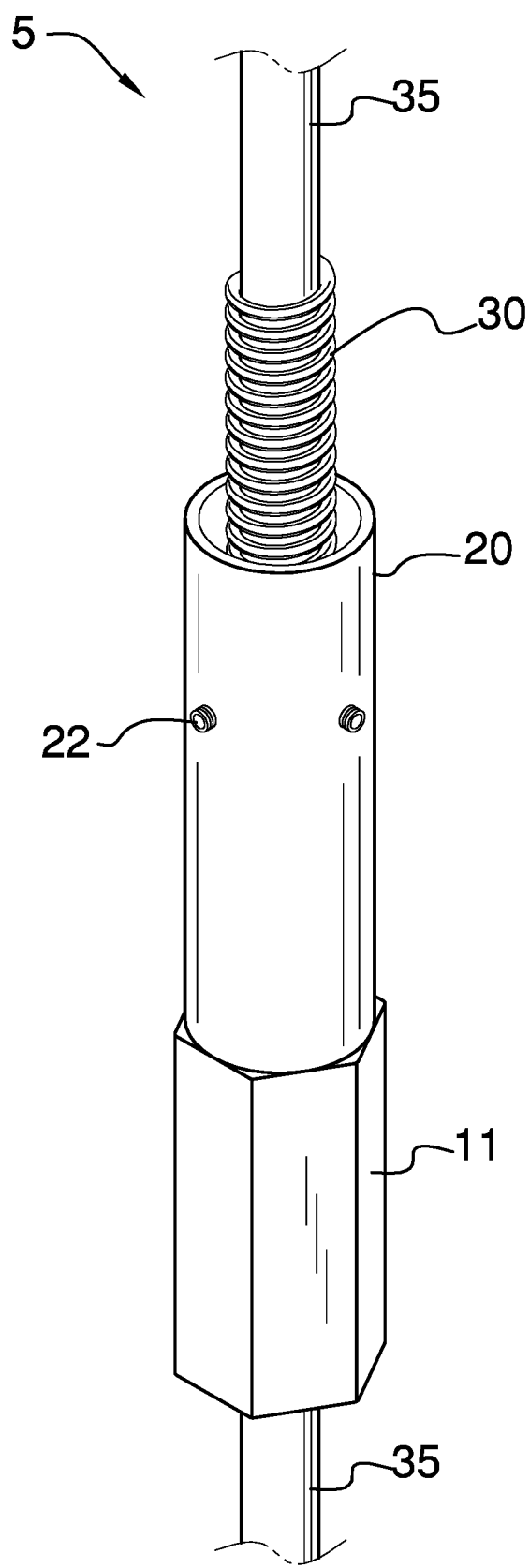
FIG. 1 is a front isometric view of the invention.

5—Device
10—Coupler plug
11—First hex member
12—Male threads
13—Plug
15—Coupler body
16—Second hex member
17—Plurality of depressions
18—Plug acceptor
20—Securement housing
21—Female Threads
22—Plurality of set screws
30—Spring
35—Hose

DETAILED DESCRIPTION OF THE EMBODIMENTS

The present invention is comprised of a coupler connection and a securement housing 20 that enables the airbrakes of a semi-truck to connect to a semi-trailer. Due to the extensive weight of the load placed on a tractor trailer or semi-trailer, it is imperative that the trailer is equipped with air brakes. The air brakes of a trailer are connected to the semi-truck or cab pulling the trailer, so that when the driver brakes the braking system for the truck and the trailer are activated. This method of braking will not only decrease the amount of time required to stop a semi-truck, but additionally assists in preventing the trailer from rotating side-ways. When the trailer moves or swerves to the side of a truck while the truck is stopping it is often referred to as, "jack-knifing" and poses a threat to any other vehicles in the area. The air brake hose quick connect device taught herein operates as an air brake hose connector for semi-trucks and semi-trailers. This device is meant to replace the glad-hands that are currently in use today.

The coupler connection is further comprised of a coupler plug 10 and coupler body 15 as depicted in FIG. 2. The coupler plug 10 is attached to the air brake hose 35 of the semi-truck and the coupler body 15 is attached to the air brake hose of the trailer.

The coupler plug 10 provides a first hex member 11, a set of male threads 12, and a plug 13. The first hex member 11 has a first end and a second end. The first end is attached or proximate to where the coupler plug 10 attaches to the air brake hose to the cab. The second end of the hex member 11 is adjacent to the set of male threads 12. The male threads 12 are adjacent to the plug 13, thus positioned between the first hex member 11 and the plug 13.

The coupler body 15 provides a second hex member 16, a plurality of depressions 17, and a plug acceptor 18. The second hex member 16 attaches to the air brake hose of the trailer as shown in FIG. 2 and FIG. 3. The plurality of depressions 17 are placed on the second hex member 16. The plug acceptor 18 is directly adjacent to the second hex member 16. A spring 30 that surrounds the air hose leading to the trailer is provided to ensure that the air hose remains connected to the trailer during normal use.

The coupler body 15 and coupler plug 10 form a coupler connection by placing the plug 13 into the plug acceptor 18. When the two sections of the device are connected pressurized air from the cab will freely flow from the cab to the trailer. There are some versions of the invention, which are not shown, that require that a spring actuated surface surrounding the plug acceptor 18 to be pulled prior to placing the plug 13 into the plug acceptor 18. Once the plug 13 is placed into the plug acceptor 18, the spring actuated surface is released thereby locking the coupler plug 10 and coupler body 15 together.

In order to protect and secure the coupler connection, the securement housing 20 is provided. The securement housing 20 is comprised of a hollow cylinder with two ends, a set of internal female threads 21, a plurality of threaded through-holes within the cylinder, and a plurality of set screws 22 that are threaded into the threaded through-holes such as shown in FIG. 3. The female threads 21 are provided at the first end of the securement housing 20. The threaded through-holes are provided near the second end of the securement housing 20, as shown in FIG. 3, and mate with the male threads 12 of the coupler plug 10. Accordingly, once the threads mate together the plurality of threaded through-holes and plurality of set screws 22 align with the plurality of depressions 17 in the second hex member 16. The plurality of set screws 22 are then threaded into the threaded through-holes until tightened against the plurality of depressions 17, as shown in FIG. 1. This alignment of the plurality of set screws with the depressions prevent the second hex member 16 from rotating loose during normal use. When the securement housing 20 is attached to the second end of the hex member 11 by interlocking the internal female threads 21 to the male threads 12 the spring 30 is compressed to ensure that the air hose 35 remains firmly attached.

While the embodiments of the invention have been disclosed, certain modifications may be made by those skilled in the art to modify the invention without departing from the spirit of the invention.

The inventor claims:

1. An air brake hose connection, which is comprised of:
   a first hex member;
   wherein the first hex member has a first end and a second end;
   a set of male threads;
   wherein the male threads are positioned on the second end of the first hex member;
   a plug;
   wherein the plug is placed positioned proximate to the male threads;
   a plug acceptor;
   wherein the diameter of the plug acceptor is larger than the diameter of the plug;
   wherein the plug is placed within the plug acceptor;
   a second hex member;
   wherein the second hex member attaches a section of air hose to a trailer;
   a plurality of depressions;
   wherein the plurality of depressions are placed on the second hex member;
   a securement housing;
   wherein the securement housing has a first end and a second end;
   said first end of the securement housing is connected to the first hex member;
   said second end of the securement housing is proximate to the trailer;
   a set of female threads are placed in the first end of the securement housing;
   a plurality of set screws;
   wherein the plurality of set screws are provided on the securement housing;
   wherein the plurality of set screws are inserted into through holes in the securement housing;
   wherein the set screws will align with the plurality of depressions on the second hex member;
   a spring
   wherein the spring is placed around the air hose;
   wherein the spring is compressed when the securement housing is attached to the second end of the first hex member.

* * * * *